United States Patent [19]
Bingham

[11] 3,866,945
[45] Feb. 18, 1975

[54] RECREATIONAL VEHICLE

[76] Inventor: John A. Bingham, 84-A Lakeview Dr., Whispering Pines, N.C. 28389

[22] Filed: May 22, 1973

[21] Appl. No.: 362,789

[52] U.S. Cl. ............... 280/202, 280/282, 280/209, 280/231
[51] Int. Cl. ....... B62k 5/04, B62k 5/08, B62k 19/46
[58] Field of Search .......... 280/202, 209, 204, 231, 280/259, 282, 7.1, 7.15, 7.16; 180/26 R, 13

[56] References Cited
UNITED STATES PATENTS

| 245,434 | 8/1881 | Bean et al. ...................... 280/282 X |
| 1,965,929 | 7/1934 | O'Connor .......................... 280/202 |
| 2,565,848 | 8/1951 | Howard ............................. 280/7.1 |
| 3,664,683 | 5/1972 | Gobby ............................. 280/202 |

FOREIGN PATENTS OR APPLICATIONS

| 22,637 | 0/1907 | Great Britain ..................... 280/209 |
| 598,690 | 12/1925 | France .............................. 280/204 |
| 377,765 | 10/1939 | Italy ................................. 280/209 |

*Primary Examiner*—Kenneth H. Betts
*Assistant Examiner*—Jack D. Rubenstein

[57] ABSTRACT

A pedal-operated, wheeled frame adapted to be driven by a rider mounted thereon includes a first connecting means for attaching one of several types of article carriers and a second connecting means for attaching an additional pedal-operated, wheeled frame to be operated simultaneously by a second rider mounted thereon.

2 Claims, 4 Drawing Figures

RECREATIONAL VEHICLE

BACKGROUND OF THE INVENTION

In recent years, there has been an increasing desire for a light-weight, inexpensive vehicle to both augment the automobile as well as provide some recreational vehicle through which the owner could eliminate the initial cost of the second automobile while providing a means of transportation to, and pleasure at, both public and private recreational and cultural facilities. Desirably, such a vehicle would provide both recreation and exercise features while allowing the user to travel to and from location a short distance from home in a minimum amount of time.

Conventional bicycles and the like have served the foregoing functions to a degree, but are not completely suitable for all occasions and uses. More specifically, bicycles are generally constructed to comfortably accommodate only one rider. Furthermore, only a very small amount of luggage or other articles can be carried on a bicycle by the use of a basket or saddlebags, or the like.

The first disadvantage has been overcome only to a limited degree by the tandem bicycle whereby one rider is positioned behind the other rider. This arrangement is not only undesirable in limiting conversation between the two riders while traveling, but also results in a cumbersome and unwieldy vehicle when it is being used by only one rider.

SUMMARY OF THE PRESENT INVENTION

The present invention on the other hand, is directed to a multi-use, pedal-operated vehicle which comprises at least one drive section including a frame, a steerable front wheel with pedals suitably attached thereto, and a first connector means attached to the rear of the frame for releasably attaching one of several types of carriage sections. The carriage sections each include basically a wheeled cart having facilities for carrying articles and/or persons with means for attachment to the first connector means on the drive section. An alternative embodiment of the present invention comprises a pair of drive sections, connected in side-by-side relation, both of which are attached to a single carriage section through suitable connector means. The alternative embodiment further includes a means for synchronizing the steering of the two drive sections.

It has been found that a vehicle of the foregoing nature overcomes the disadvantage of prior art vehicles in that a single drive section may be used with various carriage sections or with other drive sections to provide a recreational vehicle which will accommodate a single rider or a plurality of riders and which will have means for carrying a variety of different types of articles or additional persons.

The carriage section of the present vehicle may comprise a simple box-like cart for carrying a variety of different articles, or may be specially adapted to carry particular items such as golf bags. Furthermore, the carriage section, the name being used herein to generically describe means for transporting persons and/or articles, may include seating means for personnel in addition to the rider or riders.

In addition to the basic elements of at least one drive section releasably receiving a carriage section, the recreational vehicle according to the present invention may further include various optional accessories such as an overhead cover for protection of the rider during inclement or sunny weather. Also, a hitch of a conventional nature (not shown) may be provided to permit towing of the vehicle behind an automobile, or the like.

Accordingly, it is an object of the present invention to provide a multi-use, pedal-powered vehicle.

It is another object of the present invention to provide a recreational vehicle which is adapted to releasably receive various types of carriage sections.

It is yet another object of the present invention to provide a recreational vehicle of the type described which is adapted to be propelled by two drivers mounted on side-by-side drive sections. Other objects of the present invention, if not specifically set forth herein, will be obvious to the skilled artisan upon a reading of the detailed description of the invention taken in conjunction with the drawings.

DETAILED DESCRIPTION OF THE INVENTION

Figure 1:
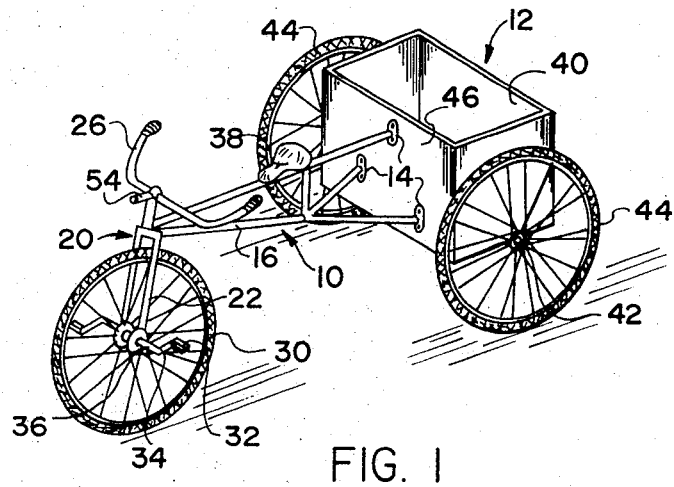
FIG. 1 is a perspective view of an embodiment of the present invention adapted to accommodate a single rider.

Referring first to the embodiment illustrated in FIG. 1 which depicts a vehicle designed to accommodate a single rider, it is seen that the apparatus comprises a drive section, generally designated at 10 and a carriage section, generally 12. These sections are releasably connected by a first connector means 14, which will be described in greater detail hereinafter.

Drive section 10 includes a generally horizontal frame 16 preferably constructed from bars of a light-weight metal such as aluminum or magnesium. In the illustrated embodiment, the lower bar 16 is bifurcated at its rearmost portion to provide increased rigidity to the vehicle upon connection of the carriage section. The aforementioned connector means 14 includes coupling members 18 at the rear ends of the bars of frame 10.

A steering column 20 is pivotally attached to the front end of frame 10 and is, with exceptions to be noted, of a structure similar to the fork used on conventional bicycles and, accordingly, will not be described in detail since its connection will be apparent to the skilled artisan. Generally, however, steering column 20 comprises a fork 22 at the lower end and an upstanding rod extending upwardly therefrom into tubular member 24 which in turn is integrally formed at the front end of frame 10.

A steering means, generally shown as handlebars 26, is attached to the upper end of rod 28 which extends slightly beyond tubular member 24 and provides a guiding system for the vehicle. Rotatably positioned between the arms of fork 22 is a bicycle-type wheel 30 having connected thereto a propulsion means, shown in the drawings to be a pair of pedals 32 rigidly attached by parallel oppositely extending arms 34 to axle 36 of wheel 30.

Extending forwardly from handlebars 26 is a second connecting means in the form of a mounting bracket, the purpose of which will be described hereinafter in greater detail.

Intermediate the front and read ends of frame 10 is positioned seat 38, of conventional bicycle-type construction, which is supported by a generally upright seat column integrally formed with frame 10.

For purposes of illustration, carriage 12 is shown in FIG. 1 to be of a simple box-like construction. It will be appreciated, after a reading of the present description, that other structures, as shown, for example, in FIG. 2, particularly adapted to contain specific articles, such as golf bags, or to carry additional persons may be substituted. Carriage section 12 comprises generally a cart 40 supported on an axle 42 having wheels 44 rotatably mounted at either end thereof. A generally upright front wall 46 of cart 40 has secured thereon a plurality of fittings 48 mateable with the connector fittings 18 at the rear of frame 10.

Figure 2:
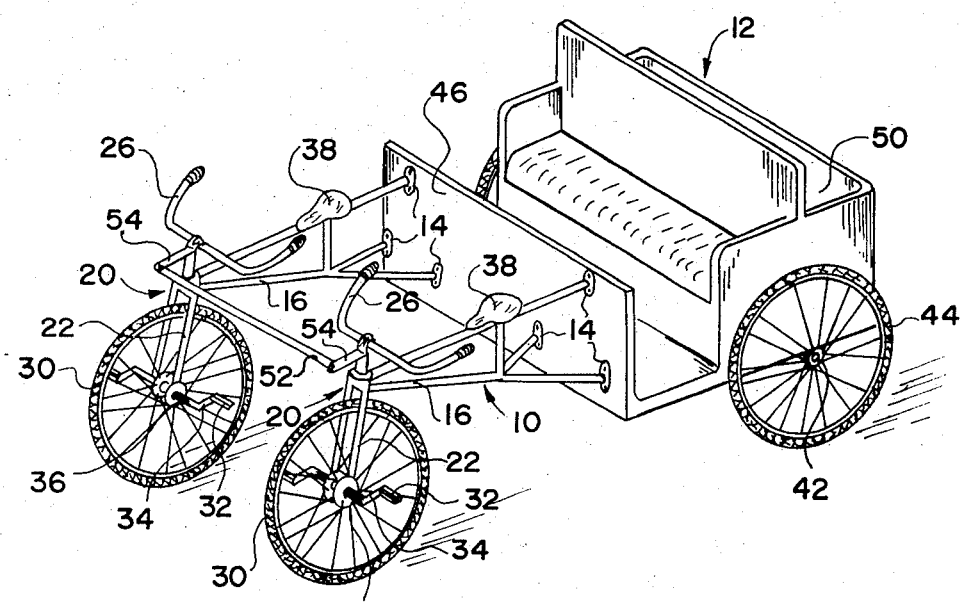
FIG. 2 is a perspective view of an alternate embodiment of the present invention adapted to accommodate two riders and illustrating a different type of carriage section.

The embodiment illustrated in FIG. 2 is designed to accommodate two riders in side-by-side position and comprises two of the above-described drive sections 10 in spaced parallel position. In this embodiment, a single carriage section 50 of the type adapted to carry passengers as well as articles extends across the area behind both drive sections and has connecting means for securing the rear portions of both drive sections thereto.

Figure 4:
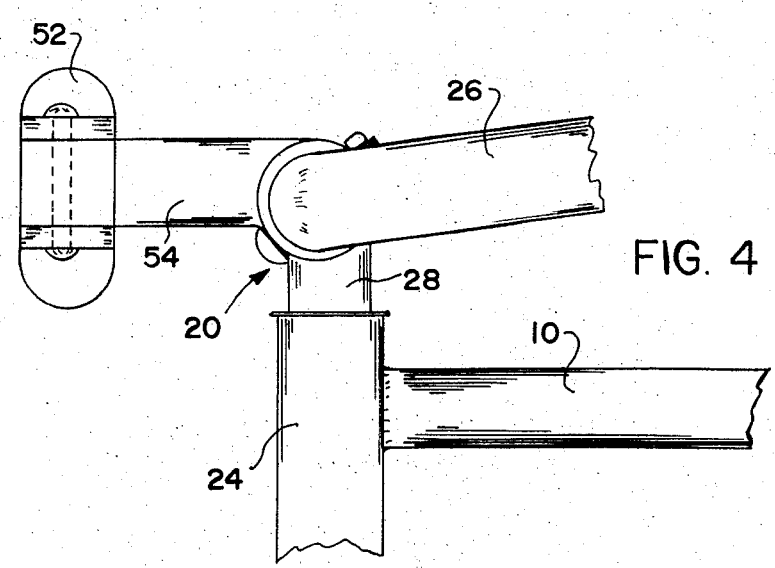
FIG. 4 is an enlarged side view of one means for providing synchronized movement between two rider carrying sections.

In order to insure simultaneous rotation of both steering columns and thus proper guidance of both drive sections, a steering synchronizing means connects the second connecting means of drive sections 10, and generally includes a rigid bar 52 pivotally attached at each end to mounting brackets 54 on the handlebars 26 of each drive section 10. It will be appreciated that mounting brackets 54 could be located at other suitable positions, e.g., on the respective forks 22 of the units 20. The construction of this synchronizing unit is shown in greater detail in FIG. 4 of the drawings.

Figure 3:
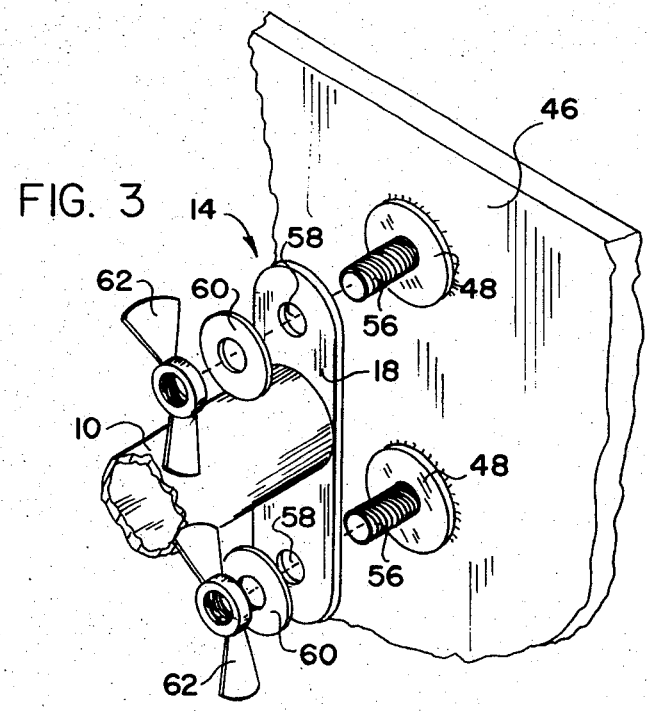
FIG. 3 is an exploded perspective view of one type of connector means for attaching the rider carrying section to the article carrying section.

The first releasable connecting means 14 illustrated in the preferred embodiment, particularly in FIG. 3, includes a pair of bolts 56 extending forwardly from front wall 46 of the carriage and rigidly secured thereto. The coupling member 18 at the rear of frame 10 contains a pair of openings 58 through which bolts 56 are inserted. The two sections are secured by use of lock washers 60 and wing nuts 62. After a reading of the present description, it will be obvious to the skilled artisan that other conventional types of connecting means may be employed for this purpose.

While the present invention has been described with reference to specific embodiments, it will be obvious to the skilled artisan that many modifications and variations may be made without departing from the spirit and scope of the invention. For example, the drive section is illustrated with a pedal-to-axle direct drive, however it would be possible to develop a chain and sprocket type drive with a coaster brake device similar to conventional bicycles.

I claim:

1. A recreational, multi-use vehicle comprising a drive section including a frame, a steering column pivotally mounted to the front end of said frame and a wheel rotatably mounted to the lower end of said steering column by means of an axle extending through said wheel and rotatably supported by said lower end of the steering column, a drive means comprising pedals attached to the ends of said axle, said frame further including an upper horizontal bar and a lower horizontal bar extending rearwardly from said front end of the frame, said lower bar being bifurcated in the rear portion thereof to provide in combination with said upper bar a three-point first connector means at the terminal ends of said upper bar and said bifurcated lower bar, a wheeled carriage comprising a planar front wall, and means connecting said three-point connector means to said front wall.

2. The vehicle according to claim 1 and further comprising a second connector means rigidly attached to said steering column, a second drive section substantially identical to said first drive section, and a rigid bar connecting said second connector means of said first drive means with the corresponding connector means of said second drive section, whereby a pair of drive sections may be so attached to a carriage section and to each other that they operate simultaneously with each other as far as rotation of the steering columns and guidance is concerned.

* * * * *